US009846523B2

(12) United States Patent
Kawalkar et al.

(10) Patent No.: US 9,846,523 B2
(45) Date of Patent: Dec. 19, 2017

(54) ADAPTIVE INTERFACE SYSTEM FOR CONFIRMING A STATUS OF A PLURALITY OF IDENTIFIED TASKS

(71) Applicant: HONEYWELL INTERNATIONAL INC., Morristown, NJ (US)

(72) Inventors: Amit Nishikant Kawalkar, Karnataka (IN); Stephen Whitlow, St. Louis Park, MN (US); Steve Hickman, Indianola, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 412 days.

(21) Appl. No.: 14/604,188

(22) Filed: Jan. 23, 2015

(65) Prior Publication Data
US 2016/0216849 A1   Jul. 28, 2016

(51) Int. Cl.
G06F 7/00 (2006.01)
G06F 3/0482 (2013.01)
G06F 11/30 (2006.01)
G06Q 10/06 (2012.01)
G08G 5/00 (2006.01)
G06F 3/0489 (2013.01)
G06F 3/0484 (2013.01)
G06F 9/44 (2006.01)

(52) U.S. Cl.
CPC ........ *G06F 3/0482* (2013.01); *G06F 3/04847* (2013.01); *G06F 3/04895* (2013.01); *G06F 11/30* (2013.01); *G06Q 10/06* (2013.01); *G08G 5/0021* (2013.01); *G06F 9/4446* (2013.01)

(58) Field of Classification Search
CPC .............. G06F 3/0482; G06F 3/04847; G06F 3/04895; G06F 11/30; G06Q 10/06; G08G 5/0021
USPC .......................................................... 701/36
See application file for complete search history.

(56) References Cited

U.S. PATENT DOCUMENTS

| 5,444,837 | A |   | 8/1995 | Bomans et al. |
| 5,454,074 | A | * | 9/1995 | Hartel ...................... B64G 1/22 434/50 |
| 5,522,026 | A |   | 5/1996 | Records et al. |
| 6,753,891 | B1 |  | 6/2004 | Chohan et al. |
| 7,260,453 | B2 |  | 8/2007 | Poier et al. |
| 8,493,240 | B1 |  | 7/2013 | Carrico |
| 8,736,464 | B1 | * | 5/2014 | Downs Mullen ...... G01C 23/00 340/521 |

(Continued)

FOREIGN PATENT DOCUMENTS

| EP | 2490162 A2 | 8/2012 |
| GB | 2420646 A | 5/2006 |
| WO | 02/35303 A2 | 5/2002 |

OTHER PUBLICATIONS

EP Search Report for Application No. 16151388.2-1803 dated Jun. 2, 2016.

(Continued)

*Primary Examiner* — Muhammad Shafi
(74) *Attorney, Agent, or Firm* — Lorenz & Kopf, LLP

(57) ABSTRACT

A system and method provide feedback regarding the confirmation of automated and operator assigned tasks, wherein one of the operator tasks and automation tasks includes a value for a parameter. The operator task and automation task that includes the value is rendered subsequent to being accomplished if the value does not match the parameter.

19 Claims, 11 Drawing Sheets

(56) References Cited

U.S. PATENT DOCUMENTS

| | | | |
|---|---|---|---|
| 2007/0150119 A1* | 6/2007 | Mitchell | G06Q 50/30 |
| | | | 701/1 |
| 2011/0160938 A1 | 6/2011 | Caillaud et al. | |
| 2013/0138467 A1 | 5/2013 | Small et al. | |
| 2014/0343762 A1* | 11/2014 | Buratto | B64D 43/00 |
| | | | 701/14 |

OTHER PUBLICATIONS

Everett, Palmer, et al. "Electronic Checklists: Evaluation of Two Levels of Automation" Proceedings of the Sixth International Aviation Psychology Symposium 1991, NASA Ames Research Center and 2San Jose State Foundation, pp. 178-183.

\* cited by examiner ized patent text follows:

ADAPTIVE INTERFACE SYSTEM FOR CONFIRMING A STATUS OF A PLURALITY OF IDENTIFIED TASKS

TECHNICAL FIELD

The exemplary embodiments described herein generally relates to adaptive user interfaces and more particularly to an adaptive user interface for confirming a status of a plurality of tasks.

BACKGROUND

Many operational situations have a plurality of tasks requiring confirmation of the task's status. Examples include monitoring of the operational situation, testing before or during the operational situation, and preliminary review of the tasks. The tasks may be active, e.g., a degree of movement, or passive, e.g., positional relationship of a moveable structure. A conventional checklist for the operation of a vehicle is a well known example.

A typical operational checklist, for example, for flight operations of an aircraft, plays an important role to ensure a vehicle is configured appropriately before initiating a specific operational phase, for example, taxi, takeoff, climb, or landing. It also helps as a tool as a memory aid, as well as providing situation awareness and workload balancing in an aircraft multi-crew environment.

The typical checklist length is variable across phases of flight and type of aircrafts. It may be as short as five items and as lengthy as three pages (like initialization checks and smoke in cockpit checks) resulting in great variation in time and workload involved execution. For example, it generally takes longer to perform a preflight checklist than a taxi out checklist. These longer checklists could result in human errors, aircraft delays, or decreases in operational efficiency.

There exist multiple variations for checklists driven by prevailing or past situations, for example engine out landing checklist and engine out during takeoff-run checklist. The combinations can be high, and it can be difficult for a pilot to remember and recall these items under significant task pressure and workload.

Typical checklist items are statically defined and may not adapt to changes in prevailing or historic situations. The situations affect inclusion of new items in the checklist or exclusion of existing ones, or changes in target values of checklist parameters. For example, if De-Ice boots failure occurs during flight, pre-defined checklists still include a FLAPS items (e.g., FLAPS 30 during landing). FLAPS are not supposed to be used if De-Ice boots failure occurs so the new operational setting should be FLAPS 0. In another example, for situations demanding bank limit variations, the pilot is expected to remember the operational limitation. Such static (inflexible) behavior of the checklist items may result in human error (recall errors) and workload surge due to in-situ pilot driven adaptations.

Known checklist items are fully controlled by a human operator (pilot) and are executed sequentially. This may result in operational inefficiency making the checklist execution time greater, which could increase turn-time on the ground and may result in revenue loss for operators. Further, for disruptions in flow pattern, the pilot may have to reiterate the flow pattern, introducing operational inefficiency as current flow patterns are lengthy.

Accordingly, it is desirable to provide an adaptive system for confirming a status of a plurality of identified tasks. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for confirming a status of a plurality of tasks.

In an exemplary embodiment, an adaptive system for confirming a status of at least one of an operator task and an automation task to an operator of a vehicle, comprises a device coupled to receive rendering commands and configured, upon receipt thereof, to render the status; a operational system configured to determine a parameter of an element of the vehicle; and a processor in operable communication with the device and the system, the processor configured to selectively supply the rendering commands to the device that cause the device to simultaneously render operator tasks and automation tasks, wherein the operator tasks have been allocated for execution by the operator, the automation tasks have been allocated for execution by automation, and one of the operator tasks and automation tasks includes a range of values associated with the parameter; inform the operator of the completion of the rendered operator tasks and automation tasks; and inform the operator of the operator task or automation task that includes the value subsequent to being accomplished if the parameter is not within the range.

In another exemplary embodiment, an adaptive system for confirming a status of at least one of an operator task and an automation task to an operator of a vehicle, the adaptive system comprises a database configured to store a first plurality of operator tasks included in a first list to be accomplished by the operator, and a first plurality of automated tasks included in the first list to be accomplished automatically; a plurality of vehicle systems configured to determine a current operational situation and a plurality of vehicle parameters; a device coupled to receive rendering commands and configured, upon receipt thereof, to render the status; and a processor in operable communication with the database, the vehicle systems, and the device, and configured to render a first task of the operator tasks; a second task of the automated tasks, wherein one of the first or second tasks include a value related to one of the vehicle parameters; and the first or second task with the value subsequent to being satisfied if the vehicle parameter is not within a predetermined range of the value.

In yet another exemplary embodiment, an adaptive system for confirming the status of at least one of an operator task and an automation task to an operator a vehicle, the adaptive system comprising a database configured to store a first plurality of operator tasks of a first list to be accomplished by the operator, and a first plurality of automated tasks of the first list to be accomplished automatically; a plurality of vehicle systems configured to determine a first vehicle operational situation, and a plurality of vehicle parameters during the first and second operational situations; a device configured to render the first and second lists; and a processor in operable communication with the database, the vehicle systems, and the device, and configured to render the first list in a first format during the first operational situation; determine if each of the automated tasks in the first list are accomplished in consideration of the operational situation and the vehicle parameters; determine when each of the operator tasks in the first list are accomplished by the operator; modify the format of each of the automated and operator tasks when accomplished; determine a value associated with one of the tasks and one of the vehicle parameters; and display the value with the task associated with the value; and continue to display the value subsequent to being identified as satisfied if the value does not satisfy a threshold.

BRIEF DESCRIPTION OF THE DRAWINGS

The present invention will hereinafter be described in conjunction with the following drawing figures, wherein like numerals denote like elements.

DETAILED DESCRIPTION

Figure 1:
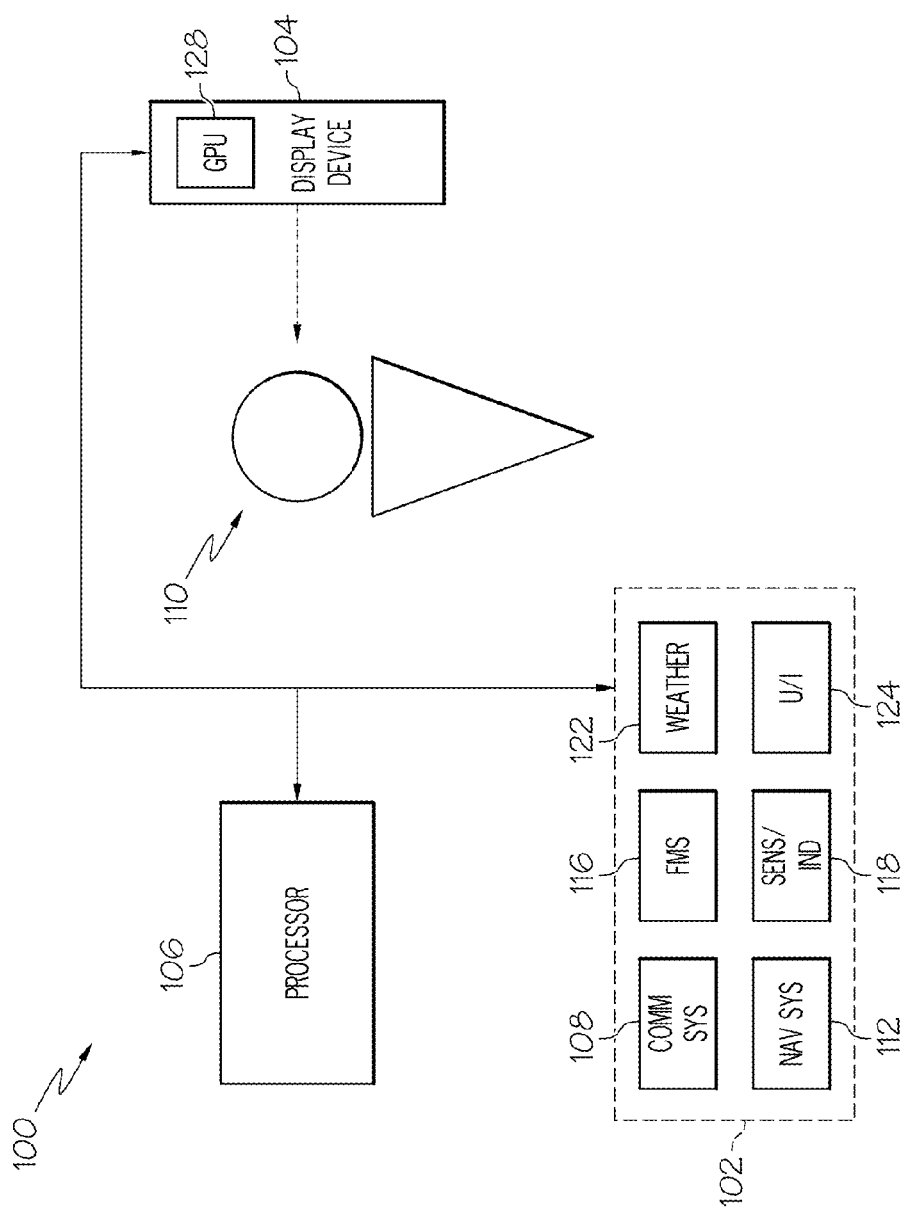
FIG. 1 depicts a functional block diagram of an example embodiment of at least a portion of an adaptive automation system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Further, unless explicitly stated otherwise, each numerical value and range described and/or illustrated herein should be interpreted as being approximate as if the word "about" or "approximately" preceded the value of the value or range.

For the sake of brevity, conventional techniques related to graphics and image processing, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

In view of the foregoing, although embodiments of the systems and methods are described herein as being implemented in the context of an aircraft flight deck avionics system, it will be appreciated that this is merely exemplary of one particular end-use environment. The described systems and methods may be implemented in numerous and varied other end-use environments such as in sea going vessels and off-site controllers, e.g., ground controllers, or any system for confirming a status of a plurality of identified tasks. Additionally, the system and method may be used in any system having an operational procedure.

It should be understood that FIG. 1 is a simplified representation of a system 100 for purposes of explanation and ease of description, and FIG. 1 is not intended to limit the application or scope of the subject matter in any way. In practice, the system 100 will include numerous other devices and components for providing additional functions and features, as will be appreciated in the art.

During the course of this description, like numbers may be used to identify like elements according to the different figures that illustrate the various exemplary embodiments.

Referring to FIG. 1, a functional block diagram of an example embodiment of at least a portion of an adaptive automation system 100 is depicted. The depicted system 100 includes at least a plurality of data sources 102, a display device 104, and a processor 106. The data sources 102 may vary in type and number, but in the depicted embodiment include various avionic systems. Some non-limiting examples of avionic systems that may comprise the data sources 102 include communication systems 108, navigation and guidance systems 112, flight management systems 116, sensors and indicators 118, weather systems 122, and various user interfaces 124 to assist an operator 110 in implementing control, monitoring, communication, and navigation functions of the aircraft. While a display device 104 is included in the exemplary embodiment as an output device for providing a preferred visual output, other output devices could be used to provide other an output other than visual. Examples include rendering audio and tactile commands.

The display device 104 is coupled to receive output rendering display commands from the processor 106 and is configured, in response to the commands, to render (display) various images and data, in a graphic, iconic, and a textual format. It will be appreciated that the display device 104 may include a display processor 128, such as a graphics processing unit, to implement this function. It will additionally be appreciated that the functions of the display processor 128 may reside in, and thus be implemented by, processor 106. The display device 104 may be implemented using any one of numerous known displays suitable for rendering graphic, iconic, and/or text data in a format viewable by the operator 110. Non-limiting examples of such displays include various cathode ray tube (CRT) displays, and various flat panel displays, such as various types of LCD (liquid crystal display), TFT (thin film transistor) displays, and OLED (organic light emitting diode) displays. The display device 104 may additionally be based on a panel mounted display, a HUD projection, or any known technology. In an exemplary embodiment, display device 104 includes a panel display. It is further noted that the system 100 could be implemented with numerous other display devices, in addition to the depicted display device 104.

The processor 106 is in operable communication with the data sources 102 and the display device 104. The processor 106 may be implemented using any one (or a plurality) of numerous known general-purpose microprocessors or application specific processor(s) that operates in response to program instructions. The processor 106 may be implemented using various other circuits, not just a programmable processor. For example, digital logic circuits and analog signal processing circuits could also be used. In this respect, the processor 106 may include or cooperate with any number of software programs (e.g., avionics display programs) or instructions designed to carry out various methods, process tasks, calculations, and control/display functions described below.

The processor 106, based on one or more of the determined states of the operator 110, the aircraft, and the aircraft mission, adaptively and dynamically allocates various tasks to be performed by the operator 110 alone, by automation alone, or by both the operator 110 and automation. Based on these adaptive task allocations, the processor 106 at least selectively supplies image rendering display commands to the display device 104 that cause the display device 104 to render images representative of the task allocations. Particular representations of images that may be rendered by the display device 104 are depicted in FIGS. 2-9, and with reference thereto will now be described.

A cognitive systems approach, improving operator efficiency, reducing human error opportunities, and providing advanced user experience have been considered in the design philosophy of the exemplary embodiments.

In a highly intelligent and connected flight deck environment, the utility of legacy checklists diminishes. Assuming that an intelligent, interactive system (IIS) can virtually recognize all possible flight segments and most operational situations, the task of configuring/monitoring the aircraft parameters within valid time window (auto-sequencing), could be mostly automated. An IIS is a system that is automated to perform certain operations in lieu of an operator (person).

However, in a real world scenario, the aforementioned total automation and completeness of knowledge would be difficult to model given technological challenges, safety issues, societal acceptance, and involved engineering costs. Therefore, the present invention provides a balanced usage of intelligent automation, pilot-automation task allocation, harmonized pilot-automation communication, and authority control levels that not only would reduce drawbacks and chances of human errors involved in traditional checklists, but also would provide elevated user experience of dealing with intelligent and rationally thinking flight automation systems with significantly improved operational efficiency.

Goals of the approach include, for example:
Support a flexible crew model
Minimize mundane tasks
Dynamically allocate tasks between IIS and humans, based on capabilities and authority of each.
Support flexible flow patterns
Minimize memory item requirements
Reduce crew situation awareness requirements
Adapt checklists based on prevailing or historical status The invention provides a design philosophy, technology and method to address human factors, operational and technological issues, including:
A typical normal checklist, e.g., preflight, before taxi, taxi, is divided between pilot and IIS.
Items requiring manual intervention, or for which automation modeling that is robust and reliable is not practicable or possible, are allocated to the pilot.
Checklist items whose execution can be automated by underlying avionics platform are allocated to the IIS.

This static allocation not only reduces length of the checklist, but also makes simultaneous execution of pilot and IIS assigned checklist items possible, thereby significantly improving operational efficiency and equally reducing probability of human error (omission and commission).

For example, consider preflight procedures and checklist which are considerably lengthy and time consuming (typically about 15 minutes). The present invention reduces pilot assigned preflight checklist items, resulting in valuable time and effort savings in the flight deck, enabling the aircrafts to quickly configure for flight and be ready for departure in less time. There is an opportunity cost to have pilots execute such mundane tasks with little to no operational value. This represents time pilots cannot apply to tasks where they can exercise their judgment and decision making.

Figure 2:
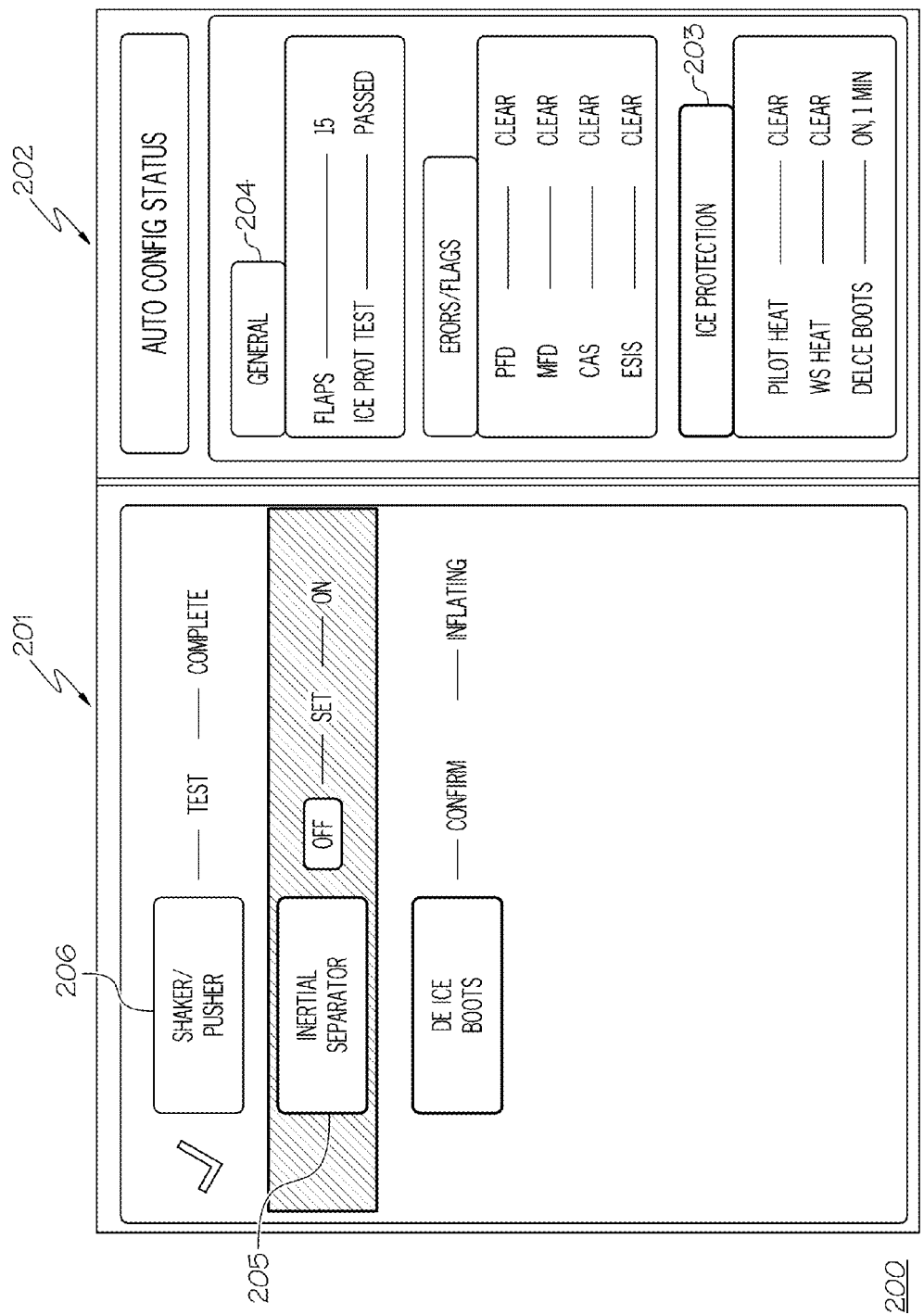
FIG. 2 depicts an example of an image that may be rendered by the display device of FIG. 1 in accordance with a first exemplary embodiment.
Figure 3:
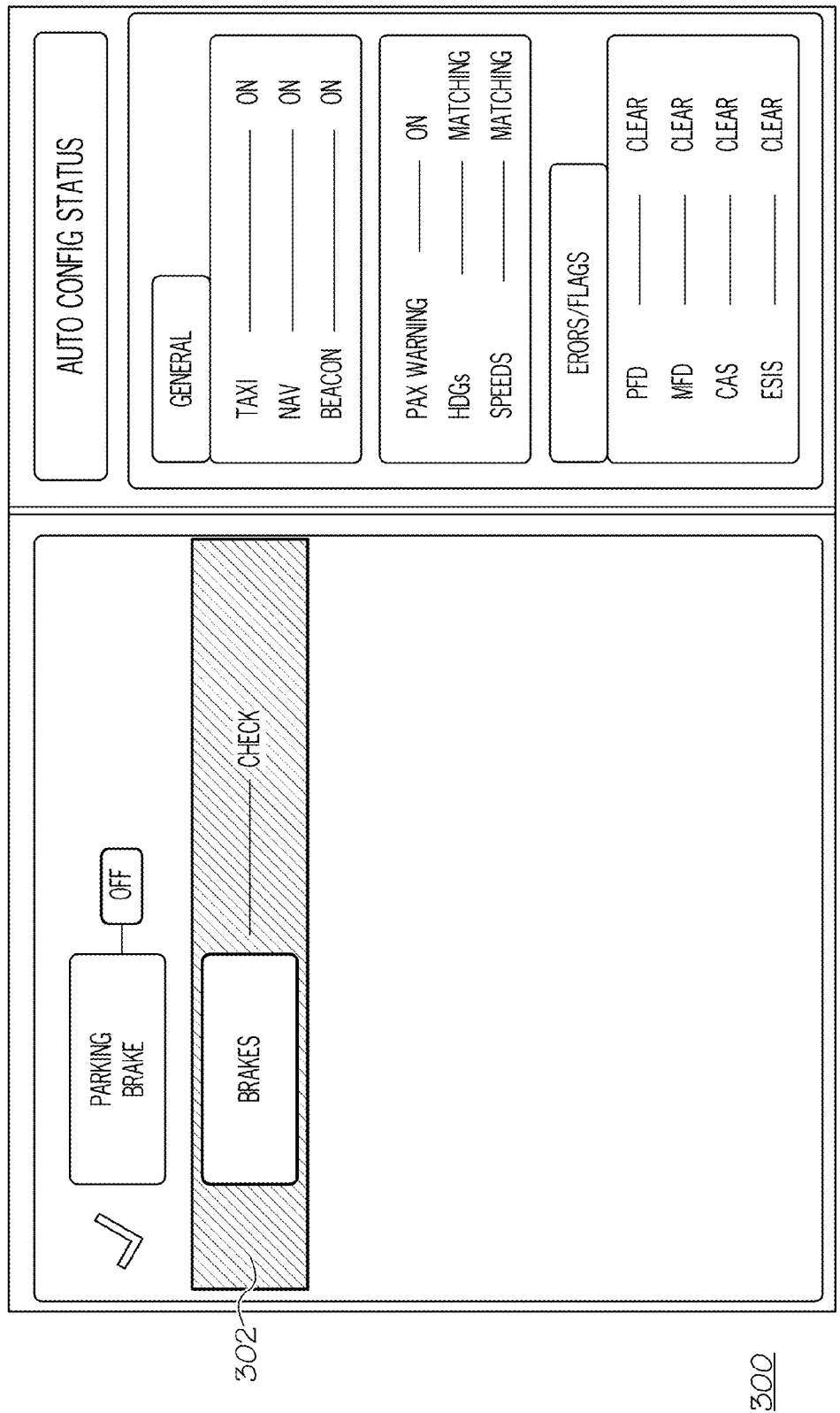
FIG. 3 depicts an example of an image that may be rendered by the display device of FIG. 1 in accordance with a second exemplary embodiment.

FIG. 2 is one example of a display 200 of pilot assigned tasks 201 and IIS assigned tasks 202. IIS assigned tasks 202 are executed automatically and their status is visually presented to the pilot by a modification in format from the uncompleted task, e.g., ICE PROTECTION 203 (incomplete) to ERROR/FLAGS 204 (complete). Similarly, the pilot assigned tasks 201 change format in a similar manner when completed, e.g., INERTIAL SEPARATOR 205 (incomplete) to SHAKER/PUSHER 206 (complete). A change in a displayed format includes any visual change, for example, a change in size, color, font, and may include deletion.

The algorithm keeps track of checklist items that 'should be' and 'must be' completed based upon the prevailing situation and situational relevance. If a checklist item is 'must be' completed before the aircraft goes in to flight phase, before which the item should have been completed (an omission) by the pilot, an 'Incomplete Checklist' Warning 302 is displayed on the display 300 (see FIG. 3).

Figure 4:
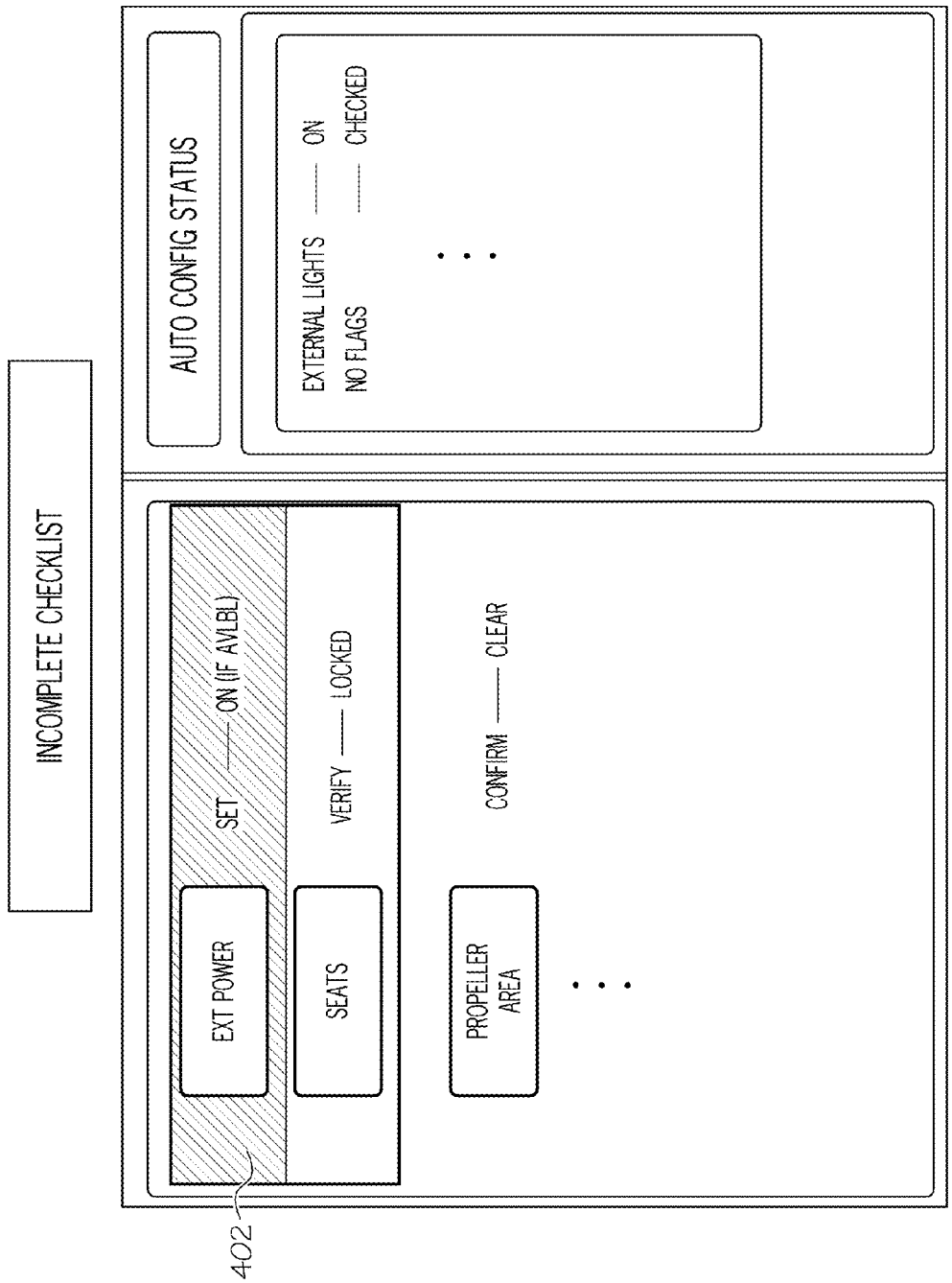
FIG. 4 depicts an example of an image that may be rendered by the display device of FIG. 1 in accordance with a third exemplary embodiment.
Figure 5:
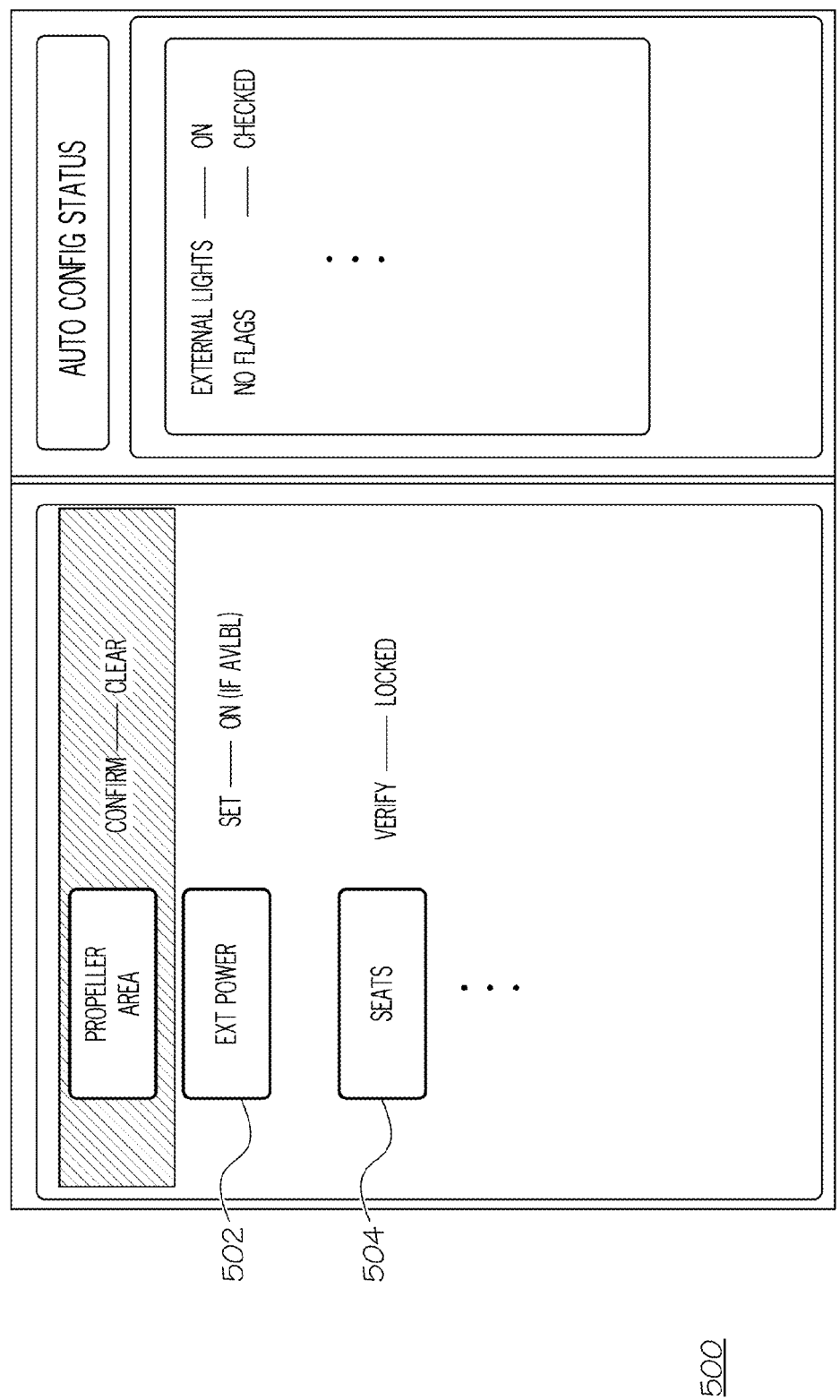
FIG. 5 depicts an example of an image that may be rendered by the display device of FIG. 1 in accordance with a fourth exemplary embodiment.
Figure 6:
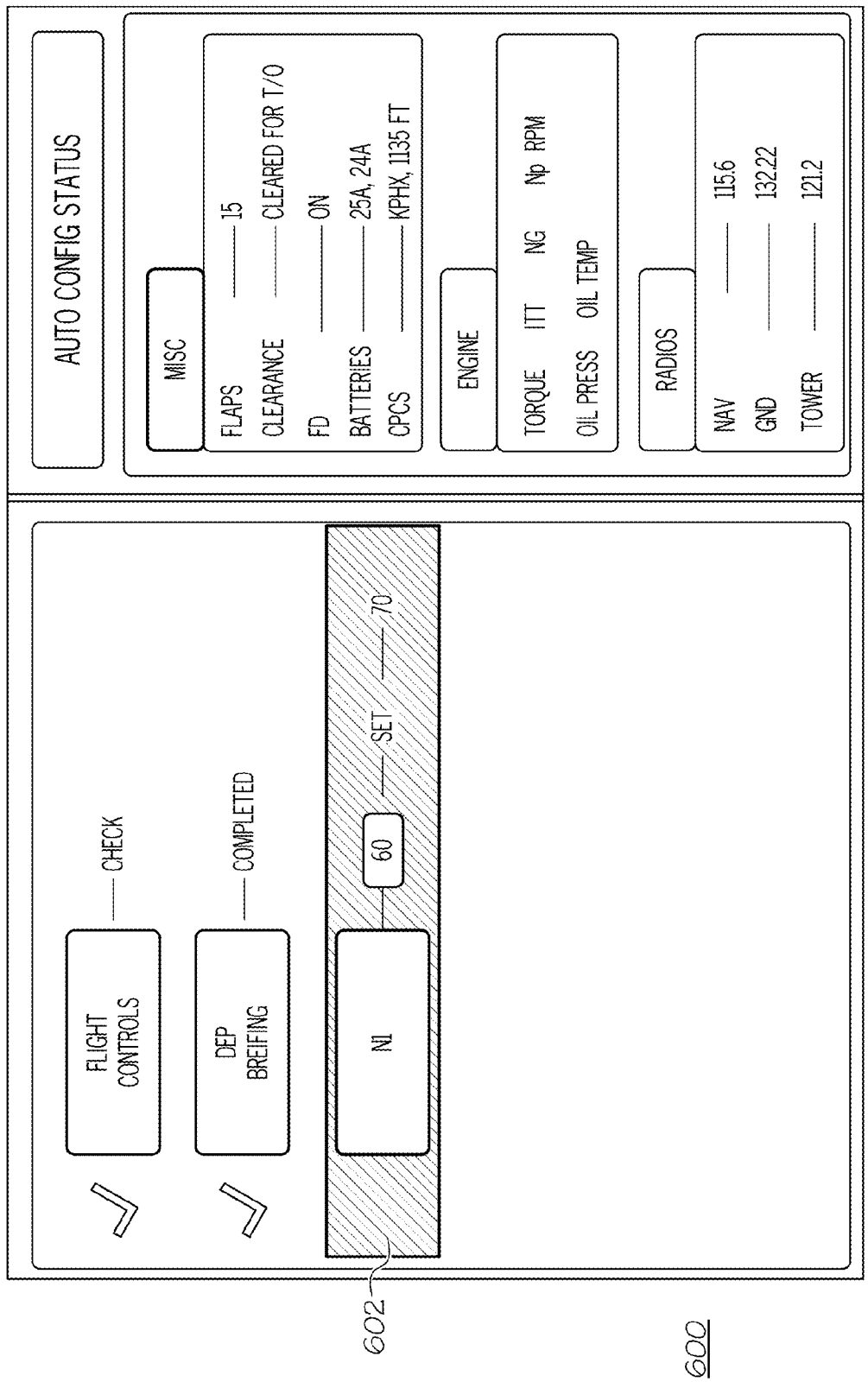
FIG. 6 depicts an example of an image that may be rendered by the display device of FIG. 1 in accordance with a fifth exemplary embodiment.
Figure 7:
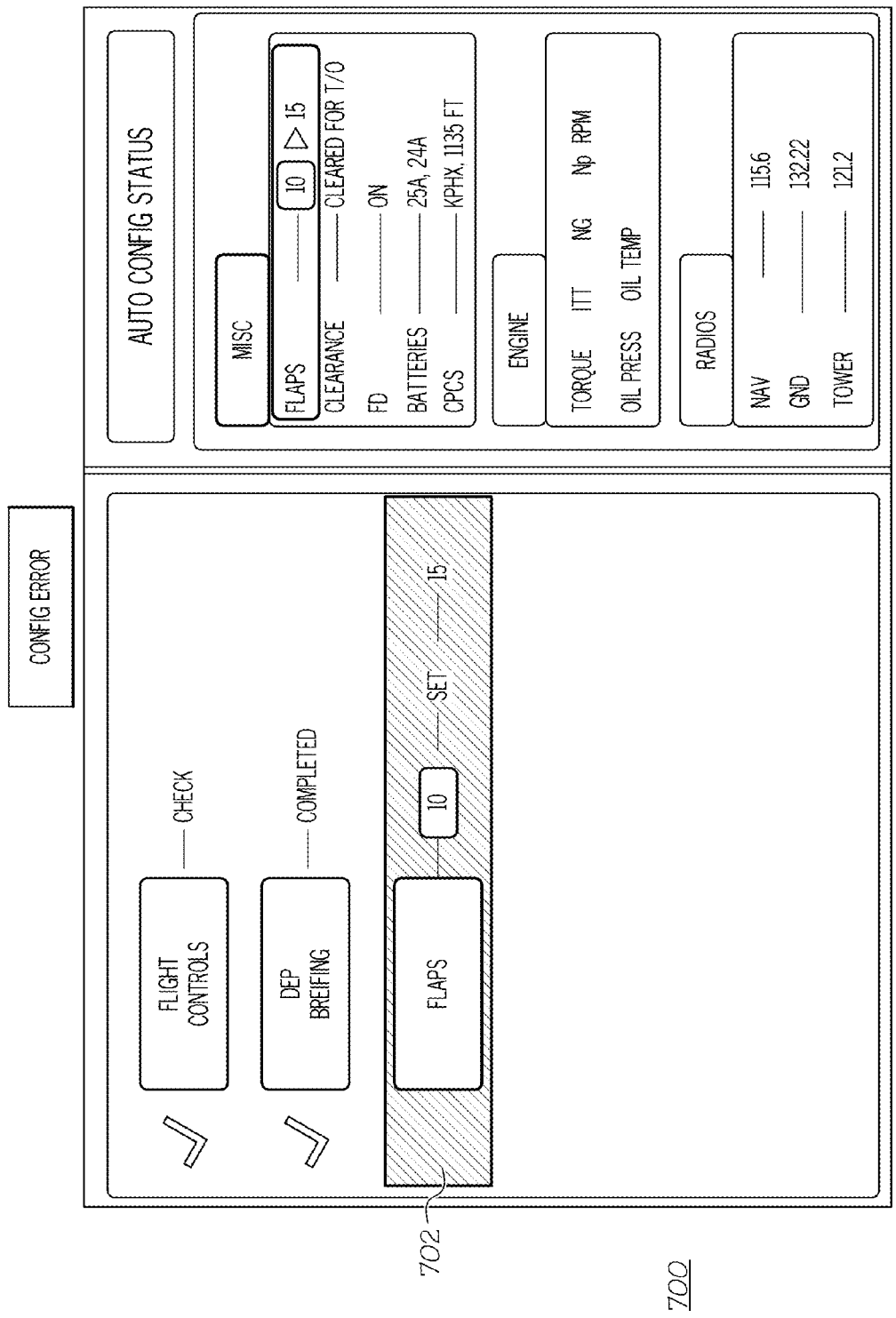
FIG. 7 depicts an example of an image that may be rendered by the display device of FIG. 1 in accordance with a sixth exemplary embodiment.

If there is a new checklist corresponding to a new flight phase, the missed items from the previous checklist are seamlessly integrated in the new checklist with higher priority. For example, FIG. 4 illustrates the display 400 having the task EXT POWER 402, uncompleted from the previous tasks, inserted and highlighted in the tasks of the new list.

The 'should be' completed items are integrated with relatively low priority with new checklists that became relevant for execution, without distracting visualizations and pilot can address them during the execution of the checklist. For example, referring to the display 500 of FIG. 5, the EXT POWER 502 and SEATS 504 tasks, are shown without being highlighted as incomplete low priority items from the previous checklist. Note that the task PROPELLER AREA 506 is a task from the new checklist.

Track of IIS and pilot assigned checklist items, or tasks, are maintained for their desired/target values as prescribed during design time or adapted to the current situation. If the actual value does not match desired values, a commission error is raised. For example, referring to the display 600 of FIG. 6, the task N1 602 has been completed; however, the value is 60 whereas the desired value is 70.

In one exemplary embodiment, this commission error is recognized and if a predetermined authority is established, the processor sends a command instruction wherein the flaps are automatically set to 70 (without manual intervention).

In another exemplary embodiment, if a commission error occurs for IIS assigned items, the corresponding item 702 is inserted into a pilot assigned checklist item list (see the display 700 of FIG. 7), so that a pilot can manually check whether the commission error from the IIS tasks is due to underlying system failure or any other reasons and take appropriate actions ensuring operational safety.

If system level failures exist for that item, then the pilot can ignore the corresponding item by special interaction, for example, an extended touch on the item (touch screen) or a voice command "IGNORE LIGHTS", and the item will not considered for any error determination and will not be shown in all future checklists.

Various dynamic situations influence the use of normal checklists. Therefore, in current systems there are multiple variations of normal checklists for abnormal operations. For example, in an Engine Out climb checklist and De-Ice Boots failure landing checklists, pilots are expected to remember the aircraft configuration variations out of historical non-normal situation that would have happened recently, e.g., several minutes ago. Such items are hard to recall by the pilot, and the pilot may fail to comply with the configuration directive of the abnormal procedures, resulting in an incident. For example, the De-Ice boots task instructs the pilot not to use flaps during landing, but the pilot may forget this directive and instead attempt to use flaps as it is shown in the normal landing checklists.

In this invention, the checklist items influenced by historical or prevailing situations are appropriately adapted from their normal operating mode, for example, a change in desired values, an inclusion of a new item, and exclusion of existing items. Thereby, the reminders excuse the pilot from remembering specific item variations corresponding to the historical and prevailing influencing situations, and reduce human error, and improve operational safety. The following types of adaptations/reminders are provided.

Figure 8:
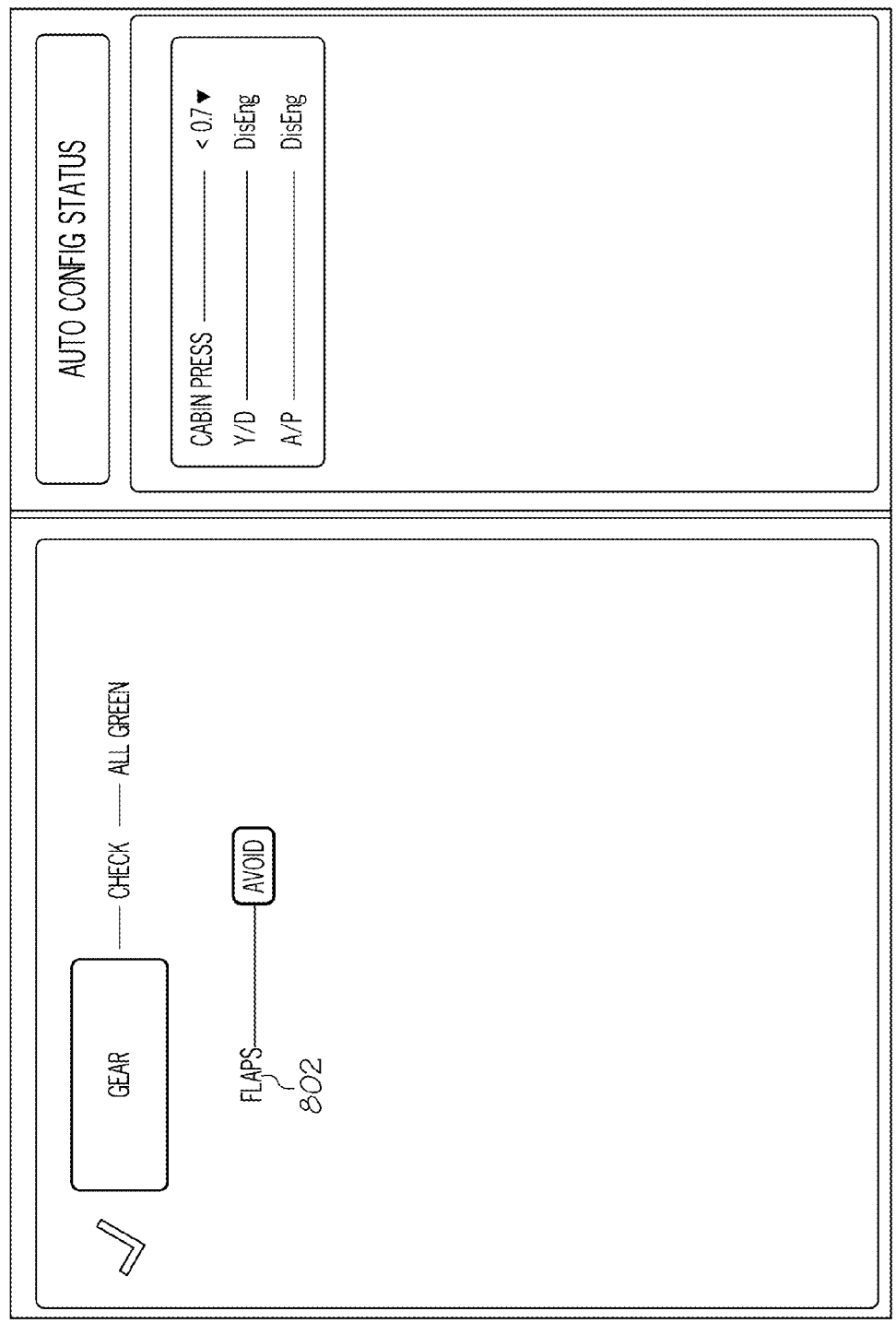
FIG. 8 depicts an example of an image that may be rendered by the display device of FIG. 1 in accordance with a seventh exemplary embodiment.

If one or more subsystems corresponding to checklist item(s) are inoperative, or historical or prevailing situations requires certain item to be operationally 'AVOIDED' by the pilot, the corresponding checklist items are disabled, removed from the presented checklist, or identified as to be avoided 802 (FIG. 8). Alternately, the pilot can manually specify the item to be ignored, for example, by long-pressing the checklist item (or any other special interaction). This 'IGNORED' item will not be involved in omission or commission error determination as well.

If prevailing or historical situations affect the desired/target values, they are adapted to suit the situational episode. Whenever the prescribed situations occur, the target values of corresponding checklist items are set to the limit values.

In addition, due to prevailing or historical situations, the pilot may have to remember and execute additional steps to ensure operational safety; however, these steps are not included as standard normal checklist, and the pilot has to recall the same steps during normal checklist execution. Such steps are inserted dynamically into the checklist based upon situational requirements.

Figure 9:
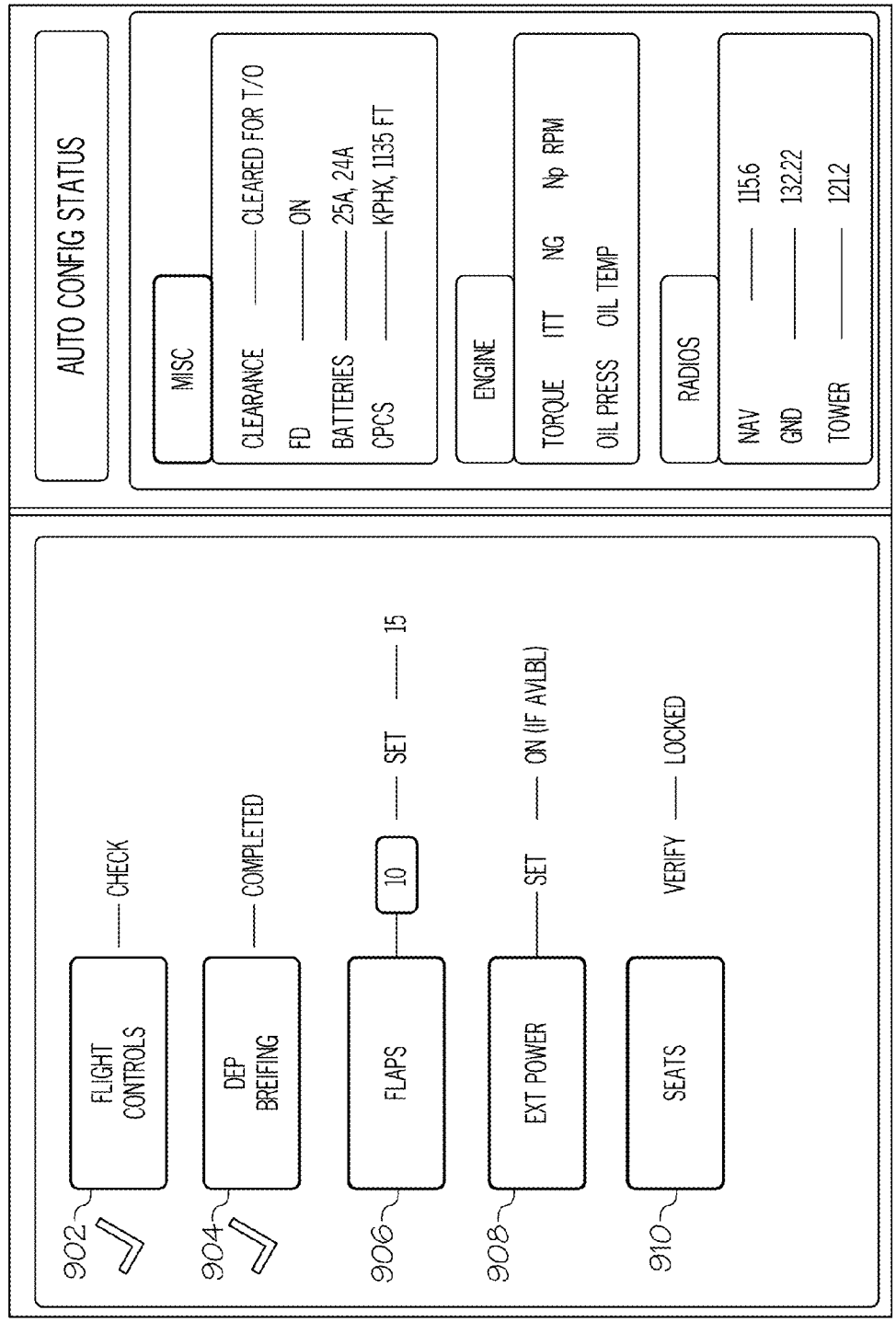
FIG. 9 depicts an example of an image that may be rendered by the display device of FIG. 1 in accordance with an eighth exemplary embodiment.

In the event of omission error (or if the pilot or IIS was unable to complete their non-critical items) incomplete checklist items 906, 908, 910 from the previous checklist get integrated with the present checklist items 902, 904 (FIG. 9). Also, in the event of an IIS oriented commission error, erroneous items are assigned to the pilot. In effect, the checklist items are integrated dynamically. These items may be arranged in order of relative priority to minimize penalty on aircraft operational efficiency and safety (see FIG. 4 and FIG. 8) as well as minimize pilot workload out of situational surprises.

Tasks (as defined in this application) are ordered based on some sort order, for example, priority, cockpit geography, time initiated, and dependency. As tasks are completed, they no longer compete for crew attention. The consequence of this is that tasks remaining are automatically 'promoted'. Every active task will be accessible, though IO constraints may force users to scroll, etc. Tasks that depend on the completion of other tasks only become active once all their dependencies have been processed. These tasks may or may not be accessible before their dependencies are satisfied.

Pilots across operational segments, for example, business, commercial, and government, have variations in checklist execution methods. These operational and individual variations are accommodated seamlessly without sacrificing usability, operational efficiency benefits and safety.

Operational variations are classified as "do-verify" and "challenge-response", wherein annunciations may be visual or aural. In the do-verify method, the pilot performs all the memory items and verifies from a printed or displayed checklist that all items are covered and configured appropriately. The pilot may perform all his memory items and internally marks the items as 'completed' if that item is 'closed-loop', e.g., the platform can determine the underlying system's state. And when the checklist is manually or automatically displayed, the pilot would have to execute his incomplete/missed assigned items, which are visually emphasized (FIG. 2). Upon successful completion of the checklist, completion is annunciated, for example, "<Checklist Name> Complete". Annunciation could also be for any grouping defined, or not used at all. Note that the pilot may initiate the challenge response to facilitate a head-up operation.

Conventionally, for the challenge-response method, the co-pilot reads out the checklist item by item, and the captain complies with the same. In the present invention, the captain executes the checklist using the challenge-response method to minimize workload involved in memory recall. In one exemplary embodiment, the captain calls out "Start <ChecklistName>", and system responds by initiating the checklist and starts executing IIS assigned items. Each pilot assigned item (challenge) is annunciated sequentially and the pilot complies with the challenge (response). Either the pilot manually checks the item if the item is not closed loop, or the item is automatically checked if closed loop. Items may be accomplished simultaneously in some situations.

The IIS assigned elements are executed only when the situation to execute the checklist becomes valid/relevant.

The exemplary embodiments provide at least the following advantages:

1. Allocates and distributes checklist items between pilot and automation.
2. The checklist initiation, execution and integration is managed to match the checklist requirements of the prevailing situation.
3. Human errors like errors of omission and commission are detected and prevented before they render the situation unmanageable, tuning down the situational workload.
4. The checklist offers two types of adaptations: 1) adding or removing items, and 2) dynamically changing values for an item.
5. The corresponding system parameter values can be set in-place through the checklist user interface without accessing a separate system, providing system abstraction, reducing time on task and head down time.
6. The proposed algorithm seamlessly accommodates to pilot's operational variations like Do-Verify and Challenge-Response.
7. OEM or operator can configure the checklist automation levels and features through easy to use configuration files.

Figure 10:
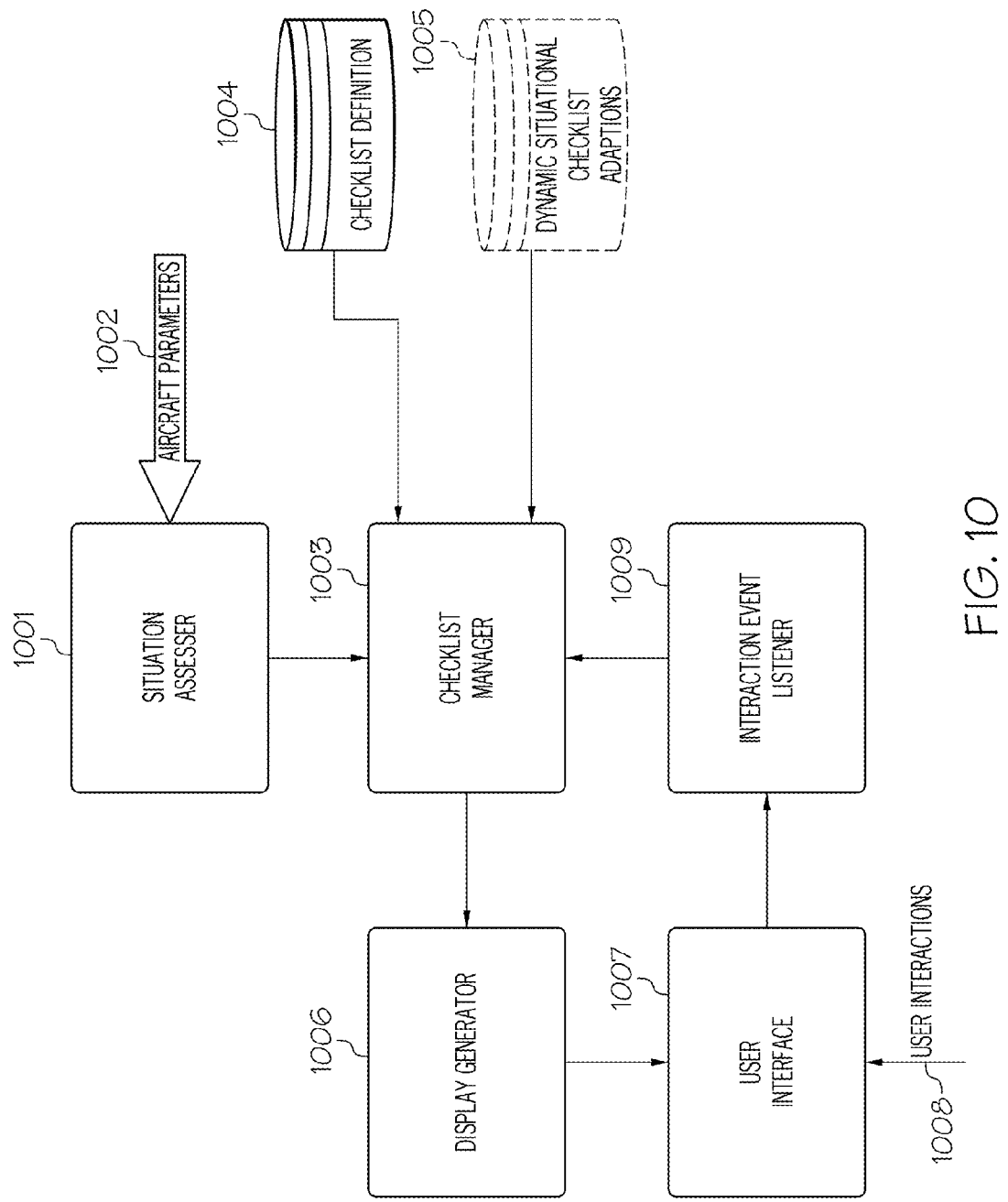
FIG. 10 depicts an exemplary embodiment of blocks of an algorithm suitable for use with the system of FIG. 1.

The algorithm performing the determination and display of the pilot and automated tasks includes, for example referring to FIG. 10, a situation assessor 1001 configured to receive aircraft parameters 1002, a checklist manager 1003 configured to receive checklist definitions 1004, dynamic situational checklist adaptations 1005, a display generator 1006, a user interface 1007 configured to receive user interactions 1008, and an interaction event listener 1009.

The situation assessor 1001 senses aircraft parameters 1002 (including operational parameters), for example, air data, FMS parameters such as trajectory, and current upcoming waypoints, from a platform bus and determines which flight phase and flight segment the aircraft is currently, and which flight phase, or segment the aircraft will sequence to in the immediate future. This information is used by the checklist manager 1003 to determine which checklist needs to be executed and which checklist must have been completed as per the prevailing situation. This component commands checklist manager to perform actions as per the prevailing and predicted situation.

The checklist manager 1003 acts on the situation assessor's 1001 commands and evaluates which checklist should be initiated and if there are any omission and commission errors. This component manages the lifecycle of the checklist from initiation, execution, logical completion, handling of commission and omission errors, as well as performs adaptations based upon dynamic situations, for example, excluding the checklist item and changing desired/target value. This checklist manager 1003 also handles interaction events issued by pilot to initiate (challenge-response) and navigate through the checklist and check, uncheck and ignore checklist items.

The checklist definition 1004 is a machine readable file, for example, an XML file, that statically defines checklists structure containing items, desired value, allocation (pilot vs. IIS), initiation conditions and interdependency. The preferred XML format allows operators to specify static structure and automation features, for example, which items can be automated based upon platform's support, which critical items must be completed before relevant situation expires and which non-critical items can be deferred and shelved. Although an XML format is preferred, any machine readable format could be used.

The interaction event listener 1009 listens to pilot events though multiple modalities like touch, trackball, voice, gesture etc. and translates the device events into checklist events for initiation, navigation, marking/unmarking, and ignoring individual items.

The display generator 1006 generates data to be displayed on the checklist display based upon the predefined display format.

The user interface 1007 with which pilot interacts with and receives all alerts and annunciations.

The situation assessment is performed based upon a state machine that defines flight phase and flight segments. Each state in the state machine has pre-conditions for that state to be relevant or valid. The parameters required for this evaluation are available on the platform bus, for example, Air Data, FMS, and Radio. This process is periodic and evaluates only transitions possible based upon current state. For example, if current state is 'Before Taxi', then conditions for valid subsequent states are the only evaluated to determine the next state. Based upon the situation assessment, commands are sent to the Checklist Management function to appropriately initiate checklists and detect checklist errors.

The process is initiated when a specific situation is evaluated to be relevant, and the corresponding checklist is initiated and presented to the user(s). At this point, IIS assigned items are executed, and the pilot executes his assigned items. The pilot may interact with dedicated checklist menus to bring the relevant checklist or issue voice command "Start <ChecklistName>", and the corresponding checklist is brought up on to the display.

Regardless of who initiates the checklist, IIS assigned items are executed as soon as the situation for the specific checklist becomes relevant. For example, as soon as taxi clearance is received and parking brake is released, items assigned to IIS are executed whether or not the checklist is being displayed. All IIS assigned items, if there exists no data or sequence dependency relationship with other IIS or pilot assigned items, are executed concurrently; otherwise they are executed as per the dependency relationship. Alternatively, the system may inform the pilot of a pending action and wait for confirmation that the action should be completed. For Do-Verify, the pilot may execute memory items and the items are tracked and corresponding items are checked. For Challenge Response, the pilot can issue command "Start <Checklist>" and SmartChecklist could then annunciate checklist items one by one and monitor whether each item is set to its desired state.

Error handling includes at least three types of errors: omission, commission, and configuration. In the case of an omission error, the situation assessor provides notification of the impending transition. If any of the safety critical checklist items is not completed, then an 'Incomplete Checklist' warning may be issued. For a commission error, if any of the checklist items (either IIS or pilot assigned) is set to a value other than desired value, then a warning is issued. In the case of a configuration error, if the erroneous checklist item is IIS assigned, then that item gets assigned to the pilot dynamically and the pilot is notified.

If a prevailing situation demands execution of new checklist and if older checklist items are not yet completed, (i.e. omission error), then the checklist items from previous unfinished checklists are integrated with current checklist items based on dependencies, so that pilot can address to them without hampering safety.

The algorithm adapts to prevailing as well as historical non-normal situations to ensure most appropriate aircraft configuration for safe operations and reduced workload by adapting the checklist in following different ways. If one or more subsystems corresponding to checklist item(s) are inoperative, the corresponding checklist items are disabled or removed from the presented checklist. Additionally, the pilot may be notified of any deviation from the normal actions and given the reason why. The pilot can manually specify the algorithm to ignore the item by marking the checklist item, or the algorithm ignores it automatically if underlying systems are sufficiently deterministic. If prevailing or historical situations affect the desired/Target values, they are adapted to suit the prevailing situations. These adaptations are performed through a situation-parameter influence map as follows. Whenever the prescribed situations occur, the target values of corresponding checklist items are set to the limit values (for example).

Historically, due to prevailing or historical situations, the pilot has to remember and execute additional steps to ensure operational safety; however, these steps are not included as standard normal checklist, and pilot has to recall the same during normal checklist execution. In this invention, such steps are inserted dynamically into the checklist based upon situational requirements.

Figure 11:
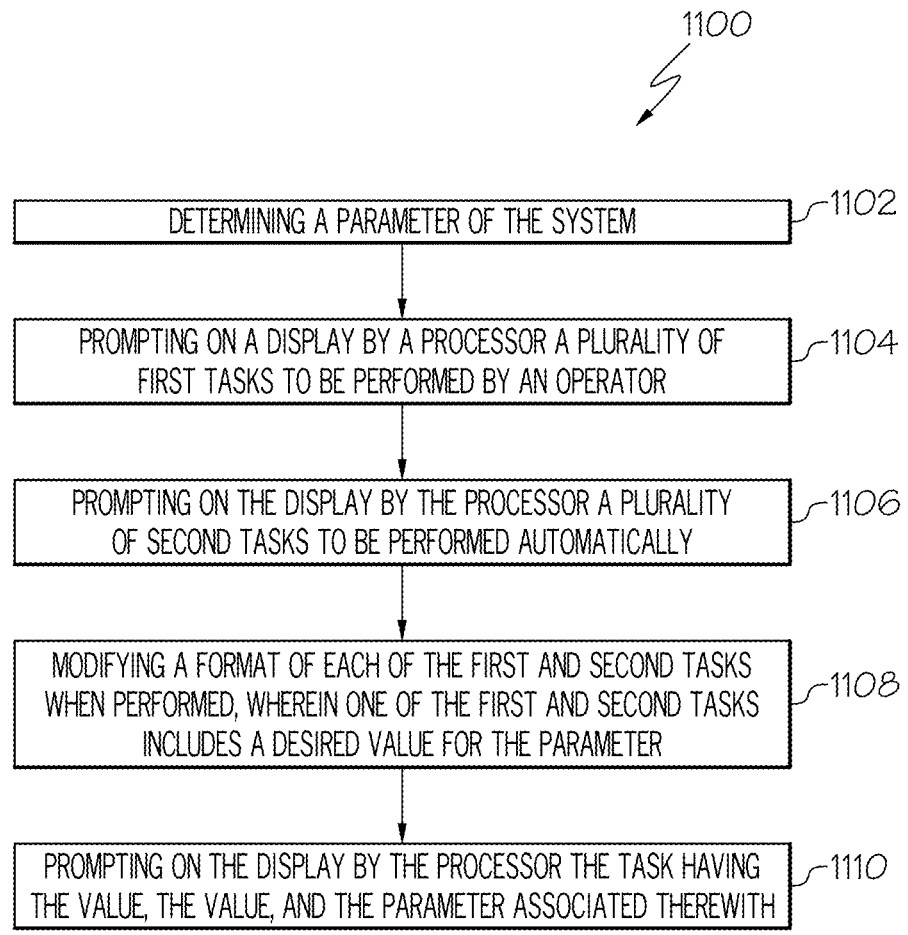
FIG. 11 a flow diagram of an exemplary method suitable for use with the display system of FIG. 1 in accordance with the exemplary embodiments.

FIG. 11 is a flow chart that illustrates an exemplary embodiment of a method 1100 suitable for use with a flight deck display system 100. Method 1100 represents one implementation of a method for displaying aircraft approaches or departures on an onboard display of a host aircraft. The various tasks performed in connection with method 1100 may be performed by software, hardware, firmware, or any combination thereof For illustrative purposes, the following description of method 1100 may refer to elements mentioned above in connection with preceding FIGS. In practice, portions of method 1100 may be performed by different elements of the described system, e.g., a processor, a display element, or a data communication component. It should be appreciated that method 1100 may include any number of additional or alternative tasks, the tasks shown in FIG. 11 need not be performed in the illustrated order, and method 1100 may be incorporated into a more comprehensive procedure or method having additional functionality not described in detail herein. Moreover, one or more of the tasks shown in FIG. 11 could be omitted from an embodiment of the method 1100 as long as the intended overall functionality remains intact.

Referring to FIG. 11, the method includes confirming a status of a plurality of identified tasks (or procedure) for an adaptive system, comprising determining 1102 a parameter of the system; prompting 1104 on a display by a processor a plurality of first tasks to be performed by an operator; prompting 1106 on the display by the processor a plurality of second tasks to be performed automatically; modifying 1108 a format of each of the first and second tasks when performed, wherein one of the first and second tasks includes a desired value for the parameter; and prompting 1110 on the display by the processor the task having the value, the value, and the parameter associated therewith.

The system described herein preferably includes a display device that provides feedback regarding the confirmation of automated and operator tasks. It additionally supports shared task execution, and displays the progress of operator, automatic, and shared tasks. The information that is described above as being displayed on the display device is merely exemplary of one embodiment, and the system is not limited to the specifically described information. The system may be configured, in some embodiments, to not display some of the above-described information. The system may also be configured, in some embodiments, to display information in addition to that which was described above.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. An adaptive system for confirming a status of at least one of an operator task and an automation task to an operator of a vehicle, comprising:
    a device coupled to receive rendering commands and configured, upon receipt thereof, to render the status;
    an operational system configured to determine a parameter of an element of the vehicle; and
    a processor in operable communication with the device and the system, the processor configured to:
        allocate a plurality of tasks as operator tasks or automation tasks, wherein the operator tasks are allocated for execution by the operator, the automation tasks are allocated for execution by automation, and one of the operator tasks and automation tasks includes a range of values associated with the parameter;
        selectively supply the rendering commands to the device that cause the device to simultaneously render the allocated operator tasks and automation tasks;
        inform the operator of the completion of the rendered operator tasks and automation tasks; and
        inform the operator of the operator task or automation task that includes the value subsequent to being accomplished if the parameter is not within the range.

2. The adaptive system of claim 1 wherein the processor is further configured to:
    automatically modify the element causing the parameter to fall within the range.

3. The adaptive system of claim 1 wherein the processor is further configured to:
    instruct the operator to take an action causing the element to be modified causing the parameter to fall within the range.

4. The adaptive system of claim 1 wherein the processor is further configured to:
    determine if a commission error in accomplishing an operator task has been committed by the operator; and
    provide a warning to the operator of the commission error.

5. The adaptive system of claim 1 wherein the processor is further configured to:
    determine if a commission error in accomplishing an automation task has been committed by automation;
    change the automation task to an operator task for presentation to the operator; and
    supply rendering commands to the device that cause the device to render the operator task changed from an automation task.

6. The adaptive system of claim 1 wherein the processor is further configured to:
    determine if an omission error in accomplishing an operator task has been committed by the operator; and
    provide a warning to the operator of the omission error.

7. The adaptive system of claim 1 wherein the processor is further configured to:
    determine if an ignore command has been issued by the operator for a specific task; and
    remove the task from being rendered.

8. The adaptive system of claim 1 wherein the processor is further configured to:
    allocate the plurality of tasks into a first list and a second list, the first list including first operator tasks and first automated tasks, the second list including second operator tasks and second automated tasks, the first operator tasks and first automated tasks of the first list being related to a first operational condition of the vehicle, the second operator tasks and second automated tasks being related to a second operational condition of the vehicle; and
    integrate first operator tasks and first automated tasks unaccomplished during the first operational condition into the second list during the second operational condition.

9. The adaptive system of claim 1 wherein the processor is further configured to:
    modify the value in accordance with operational conditions related of the vehicle.

10. The adaptive system of claim 1 wherein the processor is further configured to:
    integrate uncompleted operator tasks with subsequently rendered operator tasks.

11. The adaptive system of claim 1 wherein the processor is further configured to:
    prioritize operator tasks.

12. The adaptive system of claim 1 wherein the processor is further configured to:
    verify the identified task has been completed.

13. The adaptive system of claim 1 wherein the processor is further configured to:
    seek confirmation from the operator of an identified task being completed.

14. An adaptive system for confirming a status of at least one of an operator task and an automation task to an operator of a vehicle, the adaptive system comprising:

a database configured to store:
- a first plurality of operator tasks included in a first list to be accomplished by the operator, and a first plurality of automated tasks included in the first list to be accomplished automatically; and
- a second plurality of operator tasks included in a second list to be accomplished by the operator, and a second plurality of automated tasks included in the second list to be accomplished automatically, wherein the first plurality of operator tasks and the first plurality of automated tasks are related to a first operating mode, and the second plurality of operator tasks and the second plurality of automated tasks are related to a second operating mode;

a plurality of vehicle systems configured to determine a current operational situation and a plurality of vehicle parameters;

a device coupled to receive rendering commands and configured, upon receipt thereof, to render the status; and a processor in operable communication with the database, the vehicle systems, and the device, and configured to render:
- a first task of the operator tasks;
- a second task of the automated tasks, wherein one of the first or second tasks include a value related to one of the vehicle parameters; and
- the first or second task with the value subsequent to being satisfied if the vehicle parameter is not within a predetermined range of the value:
  the first plurality of operator tasks and the first plurality of automated tasks in the first operating mode, and the second plurality of operator tasks and the second plurality of automated tasks in the second operating mode.

15. The adaptive system of claim 14 wherein the processor is further configured to:
integrate unaccomplished operator and automated tasks from the first operating mode into the rendering of the second list during the second operating mode.

16. The adaptive system of claim 14 wherein the processor is further configured to:
automatically modify the element causing the parameter to fall within the range.

17. The adaptive system of claim 14 wherein the processor is further configured to:
instruct the operator to take an action causing the element to be modified causing the parameter to fall within the range.

18. An adaptive system for confirming the status of at least one of an operator task and an automation task to an operator a vehicle, the adaptive system comprising:
a database configured to store a first plurality of operator tasks of a first list to be accomplished by the operator, and a first plurality of automated tasks of the first list to be accomplished automatically;

a plurality of vehicle systems configured to determine a plurality of vehicle parameters depending on whether the vehicle is in a first operational situation or a second operational situation;

a device configured to render the first plurality of operator tasks and the first plurality of automated tasks simultaneously; and a processor in operable communication with the database, the vehicle systems, and the device, and configured to:
- allocate a plurality of tasks as the first plurality of operator tasks or the first plurality of automation tasks;
- render, simultaneously, the first plurality of operator tasks and the first plurality of automated tasks of the first list in a first format during the first operational situation;
- determine if each of the automated tasks in the first list are accomplished in consideration of the operational situation and the vehicle parameters;
- determine when each of the operator tasks in the first list are accomplished by the operator;
- modify the format of each of the automated and operator tasks when accomplished;
- determine a value associated with one of the tasks and one of the vehicle parameters; and
- display the value with the task associated with the value; and
- continue to display the value subsequent to being identified as satisfied if the value does not satisfy a threshold.

19. The adaptive system of claim 18 wherein the processor is further configured to:
render a second list during the second operational situation, wherein the automated and operator tasks of the first list not accomplished during the first operational situation are integrated in the second list.

* * * * *